(12) United States Patent
Nguyen et al.

(10) Patent No.: US 10,252,412 B2
(45) Date of Patent: Apr. 9, 2019

(54) MOBILE ROBOT

(71) Applicant: Panasonic Intellectual Property Management Co., Ltd., Osaka (JP)

(72) Inventors: Duyhinh Nguyen, Osaka (JP); Katsuhiko Nishizawa, Hyogo (JP); Tsukasa Hojo, Osaka (JP); Keisuke Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 15/592,972

(22) Filed: May 11, 2017

(65) Prior Publication Data

US 2017/0348850 A1    Dec. 7, 2017

(30) Foreign Application Priority Data

Jun. 2, 2016    (JP) .................................. 2016-111031

(51) Int. Cl.
 *B25J 5/00*   (2006.01)
 *H01F 7/02*   (2006.01)
 (Continued)

(52) U.S. Cl.
 CPC ............. *B25J 5/007* (2013.01); *B60B 19/006* (2013.01); *B62D 57/024* (2013.01); *H01F 7/0221* (2013.01); *Y10S 901/01* (2013.01)

(58) Field of Classification Search
 CPC ........ B25J 5/00; B60B 19/006; B62D 57/024; H01F 7/0221; Y10S 901/01
 See application file for complete search history.

(56) References Cited

U.S. PATENT DOCUMENTS

| 2010/0096816 A1 | 4/2010 | Cheng et al. |
| 2011/0174565 A1 | 7/2011 | Rochat et al. |

(Continued)

FOREIGN PATENT DOCUMENTS

| JP | 2005-349859 | 12/2005 |
| JP | 2010-095240 | 4/2010 |

(Continued)

*Primary Examiner* — Khoi H Tran
*Assistant Examiner* — Robert T Nguyen
(74) *Attorney, Agent, or Firm* — Panasonic IP Management; Kerry S. Culpepper

(57) ABSTRACT

In mobile robot that runs from first flat surface which is a magnetic body to second flat surface which is a magnetic body and intersects the first flat surface, the mobile robot includes a pair of driving wheels which is rotatably supported to robot body and includes permanent magnets on outer circumferential surfaces thereof; driving mechanism which drives the pair of driving wheels to be independently rotated; rear wheel which is rotatably supported to the robot body and includes permanent magnets on an outer circumferential surface thereof; distance sensor which acquires a distance to the second flat surface; and pressing out mechanisms which include pressing out members which are movable between contact position at which the pressing out member can be in contact with the first flat surface and retracted position at which the pressing out member is retracted from the first flat surface. The pressing out member is moved from the retracted position to the contact position to be in contact with the first flat surface by the pressing out mechanism, the driving wheels is separated from the first flat surface, and the driving wheels move from the first flat surface to the second flat surface, when the distance sensor detects that the driving wheels are in contact with the second flat surface.

9 Claims, 19 Drawing Sheets

(51) Int. Cl.
  *B60B 19/00*   (2006.01)
  *B62D 57/024*  (2006.01)

(56) References Cited

U.S. PATENT DOCUMENTS

| | | | |
|---|---|---|---|
| 2015/0151572 A1* | 6/2015 | Parrott | B60B 19/12 |
| | | | 301/5.23 |
| 2017/0334241 A1* | 11/2017 | Gonzalez | B60B 19/006 |
| 2018/0313715 A1* | 11/2018 | Cichosz | B60B 19/003 |
| 2018/0370019 A1* | 12/2018 | Lotz | B60B 19/006 |
| 2018/0370279 A1* | 12/2018 | Reboredo Losada | B61C 15/04 |

FOREIGN PATENT DOCUMENTS

| | | |
|---|---|---|
| JP | 2011-121579 | 6/2011 |
| JP | 2014-073745 | 4/2014 |

\* cited by examiner

MOBILE ROBOT

TECHNICAL FIELD

The technical field relates to a mobile robot which is movable from a first running surface to a second running surface intersecting the first running surface, for example.

BACKGROUND

A mobile robot used for maintenance inspection, cleaning, or the like on a wall surface of a structure needs to run along the wall surface. As a method which can run along the wall surface, in a case where the wall surface is a magnetic body, it is conceivable to provide a mechanism which is attracted on the wall surface by magnetic force.

As a mobile robot including a magnetic attraction mechanism, a mobile robot which can generate magnetic attraction force on a running surface by using a magnet to a driving wheel is proposed in the related art (See Japanese Patent Unexamined Publication No. 2014-73745).

FIG. 7 is a view illustrating outline of magnetic body flat surface attraction mobile device 21 in Japanese Patent Unexamined Publication Mo. 2014-73745. Vehicle body 22 of magnetic body flat surface attraction mobile device 21 includes magnet wheel 23 which can be driven and rotated. Magnet wheel 23 includes magnetic attraction force and an outer circumferential surface thereof includes depressions and projections by arranging projection portions 27 in a circumferential direction. Magnetic body flat surface attraction mobile device 21 is provided with tail portion 29 including magnetic attraction force rearward with respect to a direction of arrow A. Here, it is assumed that magnetic body flat surface attraction mobile device 21 also runs on flat surface forming member 25 which is a member forming a step with respect to flat surface 24, in addition to running on flat surface 24. Flat surface forming member 25 is present to be parallel at a fixed distance with respect to flat surface 24, and step 26 is present between flat surface 25b which is an upper surface of flat surface forming member 25 and flat surface 24.

Magnetic body flat surface attraction mobile device 21 runs on flat surface 24 in a direction of arrow A in FIG. 7 by magnet wheel 23 being rotated in a direction indicated by arrow B in FIG. 7. Magnetic body flat surface attraction mobile device 21 moves forward until a recess between projection portion 27 and projection portion 27 of magnet wheel 23 reaches end edge 25a of flat surface forming member 25 while running on flat surface 24. At this time, projection portion 27 is in contact with flat surface 25b, which is the upper surface of flat surface forming member 25. By further rotating magnet wheels 23 in this state, a rotation motion is started about a contact point between end edge 25a of flat surface forming member 25 and magnet wheel 23, and magnet wheel 23 can be pulled apart from flat surface 24 before step 26 and transferred to flat surface 25b having step 26.

Thereafter, following forward running of magnet wheel 23 on flat surface 25b, magnetic body flat surface attraction mobile device 21 allows tail portion 29 to move over step 26 by transferring tail portion 29 from original flat surface 24 to flat surface 25b having step 26.

According to this method, even in a case where it is necessary to move over the step in the middle of the running surface, since the driving wheel can be always attracted to at least one of the first running surface before the step and the second running surface after moving over the step, the mobile robot can always maintain magnetic attraction force with respect to the running surface.

SUMMARY

However, in the configuration of the related art, although movement between two flat surfaces which are parallel to each other and have different heights from each other is possible, in a case where the two flat surfaces are orthogonal to each other, for example, when movement from a wall surface to a wall surface or from a wall surface to a ceiling surface is performed, a magnet wheel which is a driving wheal is restrained by the magnetic force with respect to a flat surface orthogonal to a flat surface on which the driving wheel is running, the magnet wheel cannot rotate any further, and thus there is a problem that a mobile robot is stopped.

In view of the above problems, as well as other concerns, an object of the present disclosure is to provide a mobile robot capable of moving between two flat surfaces even in a case where the two flat surfaces intersect each other.

In order to achieve the object described above, according to one aspect of the disclosure, there is provided a mobile robot that runs from a first flat surface which is a magnetic body to a second flat surface which is a magnetic body and intersects the first flat surface, including a robot body; a pair of driving wheels which is rotatably supported to the robot body and includes permanent magnets on outer circumferential surfaces thereof; a driving mechanism which is provided to the robot body and drives the pair of driving wheels to be independently rotated, respectively; a rear wheel which is rotatably supported to the robot body and includes permanent magnets on an outer circumferential surface thereof; a distance sensor which is provided to the robot body and acquires a distance to the second flat surface; and pressing out mechanisms which are provided to the robot body and include pressing out members which are movable between a contact position at which the pressing out member can be in contact with the first flat surface and a retracted position at which the pressing out member is retracted from the first flat surface. The pressing out member is moved from the retracted position to the contact position to be in contact with the first flat surface by the pressing out mechanism, the driving wheels are separated from the first flat surface, and the driving wheels move from the first flat surface to the second flat surface, when the distance sensor detects that the driving wheels are in contact with the second flat surface.

As described above, according to the mobile robot of the aspect of the disclosure, even in a case where the distance sensor detects that the driving wheels are in contact with the second flat surface and the driving wheels are restrained on both flat surfaces which are the first flat surface and the second flat surface intersecting the first flat surface and on which the mobile robot is running by magnetic attraction force, the pressing out members are moved from the retracted position to the contact position to be in contact with the first flat surface by the pressing out mechanisms, the driving wheels are separated from the first flat surface, and thus the driving wheels can be moved from the first flat surface to the second flat surface and the driving wheels can be rotated on the second flat surface again. Therefore, the mobile robot can smoothly move from the first flat surface to the second flat surface, for example, from a wall surface to a wall surface or from a wall surface to a ceiling surface.

DESCRIPTION OF EMBODIMENTS

First Embodiment

Hereinafter, mobile robot 100 according to the first embodiment of the disclosure will be described.

Figure 1:
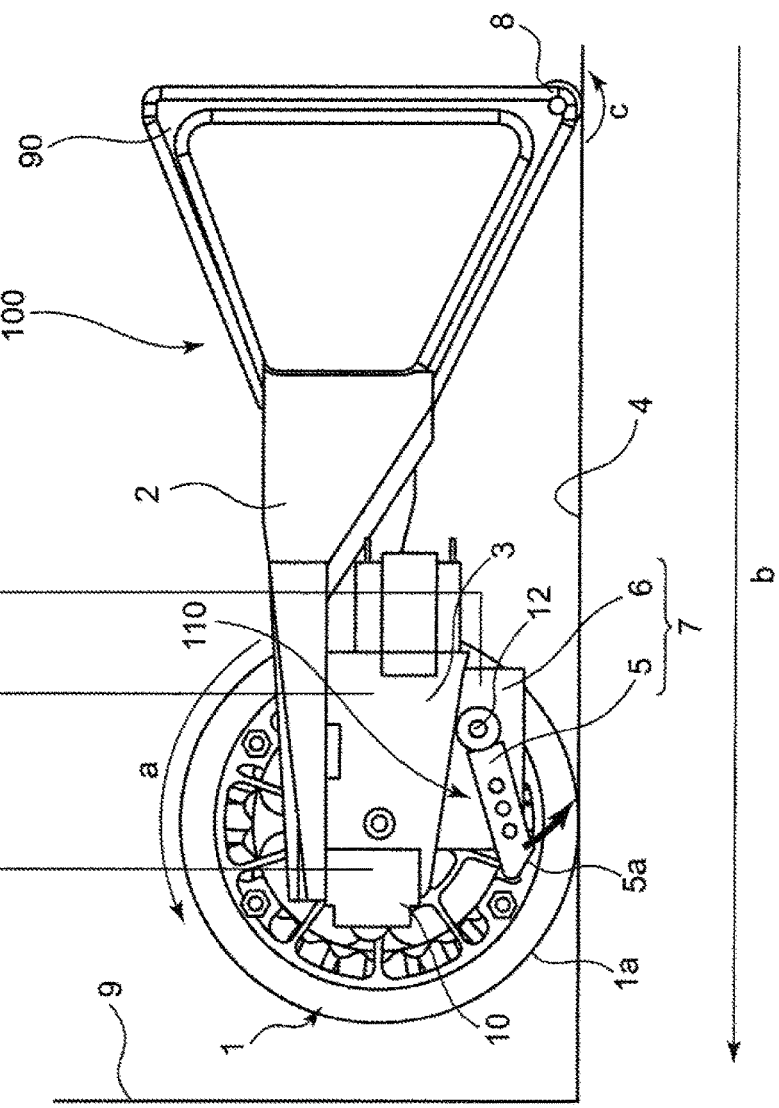
FIG. 1 is a partial cross-sectional view of an axle of a driving wheel according to a first embodiment of the disclosure.
Figure 2:
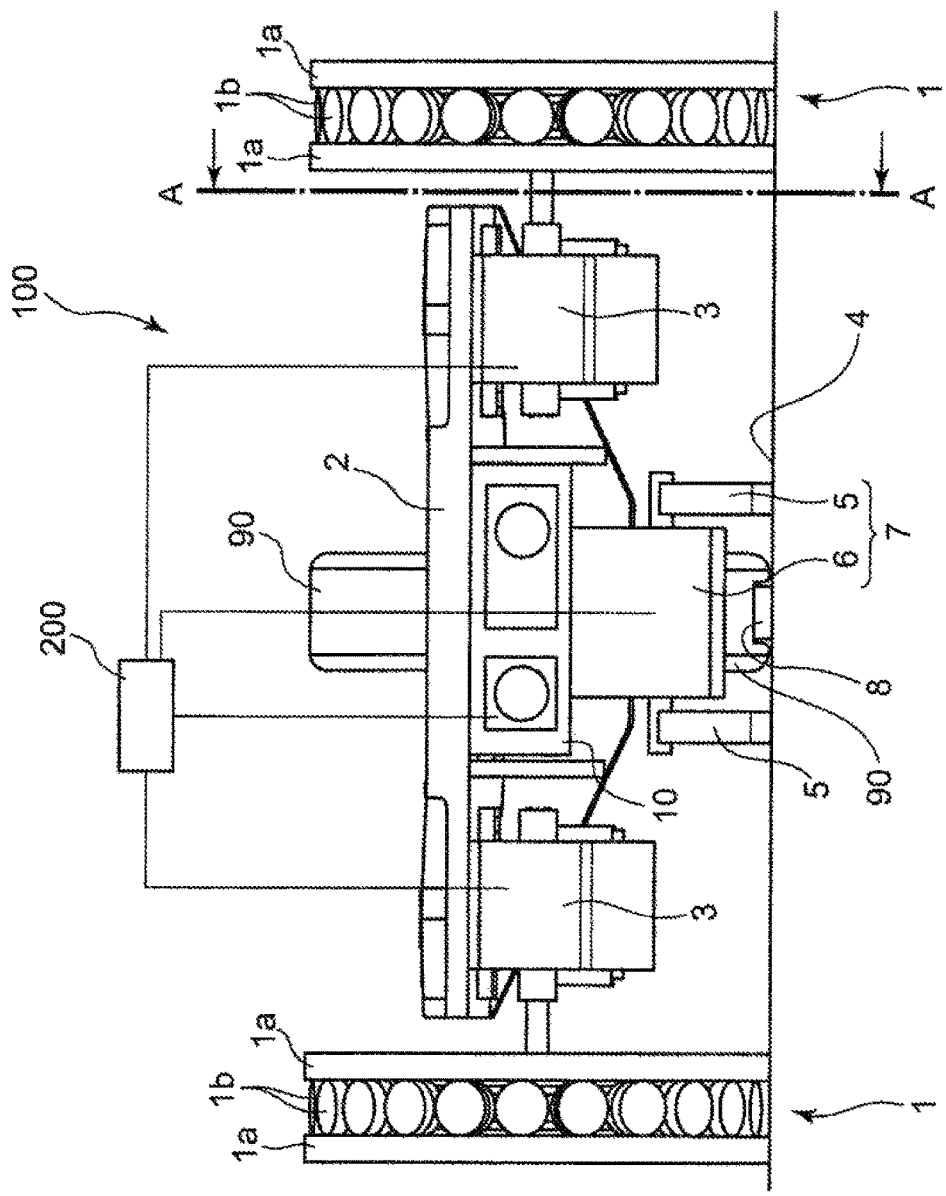
FIG. 2 is a front view illustrating a mobile robot according to the first embodiment of the disclosure.

FIG. 2 is a front view illustrating mobile robot 100 according to the first embodiment of the disclosure and FIG. 1 is a view illustrating section A-A which is illustrated in FIG. 2 viewed from the right side toward the page of FIG. 2.

Mobile robot 100 includes robot body 2, a pair of driving wheels 1, a pair of driving mechanisms (rotation driving mechanisms) 3, rear wheel roller 8, distance sensor 10, and a pair of pressing out mechanisms and can run from first flat surface 4 which is a magnetic body to second flat surface 9 which is a magnetic body and intersects (for example, is orthogonal to) first flat surface 4. Although at least one driving wheel 1 may be provided, here, a case where a pair of driving wheels is provided as an example will be described.

The pair of driving wheels 1 is rotatably provided on both sides of mobile robot body 2. As illustrated in FIG. 2, driving wheels 1 are provided with a large number of small columnar permanent magnets $1b$ on the entire circumference of an outer circumferential surface and are configured so as to provide magnetic attraction force on the flat surface which is a magnetic body.

Figure 3A:
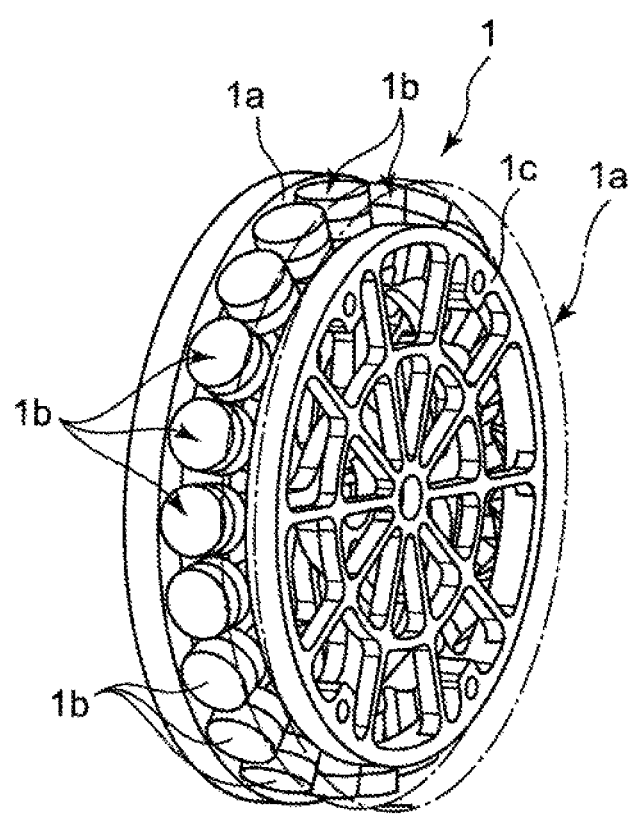
FIG. 3A is a perspective view illustrating a configuration of a driving wheel.
Figure 3B:
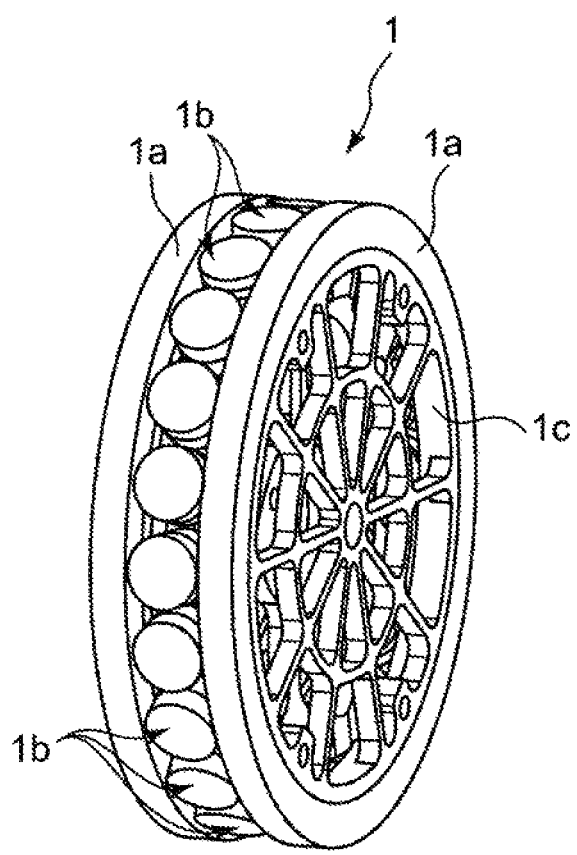
FIG. 3B is a perspective view illustrating the configuration of the driving wheel.

FIG. 3A and FIG. 3B are perspective views illustrating a configuration of each driving wheel 1. As illustrated in FIG. 3A and FIG. 3B, each driving wheel 1 includes a pair of tire rubbers $1a$ which improves frictional force with flat surfaces 4 and 9 on which the mobile robot runs, a plurality of permanent magnets $1b$ which generate magnetic attraction force with respect to flat surfaces 4 and 9 which are magnetic bodies, and one wheel $1c$ which holds the pair of tire rubbers and the plurality of permanent magnets. Although tire rubber $1a$ is fixed to both side surfaces of wheel $1c$ by adhesion and permanent magnets $1b$ are fixed to the outer circumferential surface of wheel $1c$ by a resin screw, other means may be used as long as the permanent magnet can be fixed. In general, although each tire rubber $1a$ is preferably made of rubber or resin, a material having a high friction coefficient may be selected according to a material of flat surfaces 4 and 9 on which the mobile robot runs. Although neodymium magnet with a strong magnetic force in general is preferably used for each permanent magnet $1b$, a material having strong magnetic attraction force may be selected according to the material of flat surfaces 4 and 9 on which the mobile robot runs. In addition, in the first embodiment, although a circular magnet is used for each permanent magnet $1b$, a shape thereof is not particularly limited.

Figure 3C:
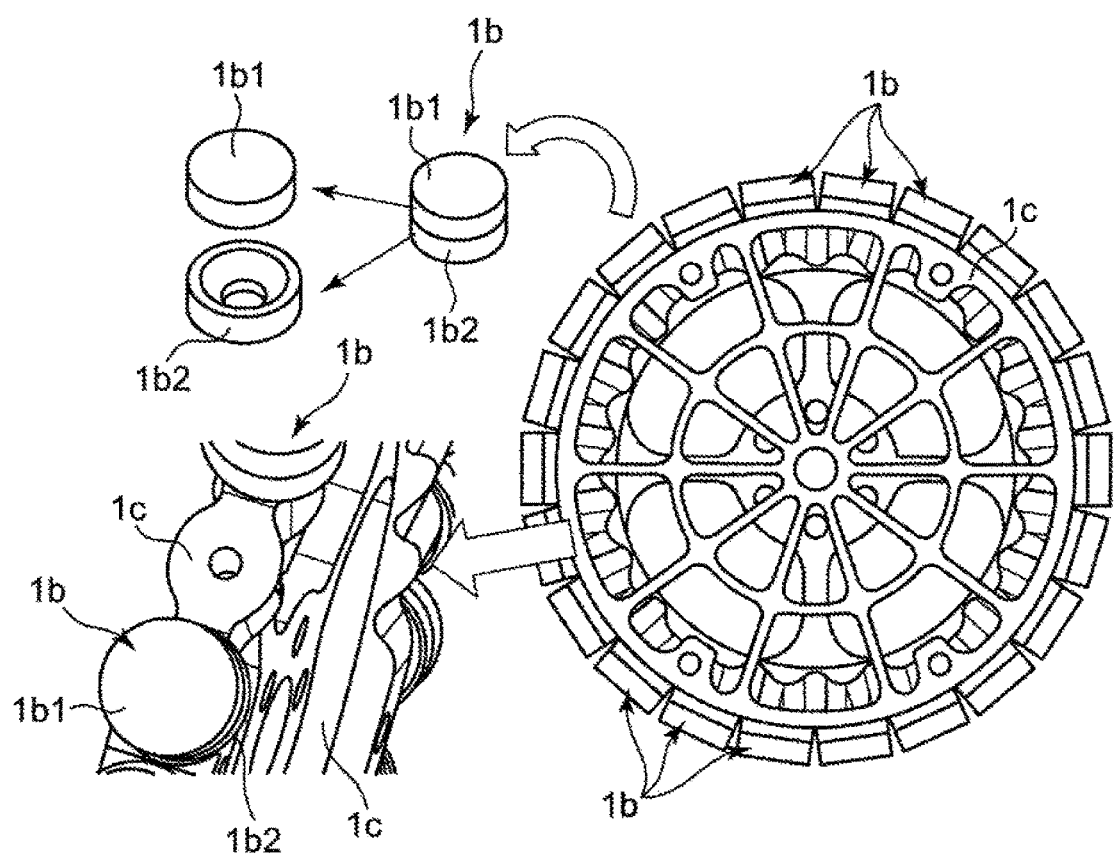
FIG. 3C is an enlarged view illustrating a wheel of the driving wheel in detail.

FIG. 3C is a detailed view illustrating a configuration for fixing wheel $1c$ and permanent magnet $1b$ of each driving wheel 1 in detail. Each driving wheel 1 of mobile robot 100 is configured by fixing a large number of permanent magnets $1b$ to the outer circumferential surface of wheel $1c$ at each fixed angle as illustrated in FIG. 3C. In addition, in order to fix each permanent magnet $1b$ to wheel $1c$, each permanent magnet $1b$ is configured by columnar magnet $1b1$ and perforated columnar magnet 12. Perforated columnar magnet $1b2$ is fixed to the outer circumferential surface of wheel $1c$ by a resin screw, and columnar magnet $1b1$ is attracted and fixed to perforated columnar magnet $1b2$ by magnetic force. With such a configuration, since the entire surface of each permanent magnet $1b$ can be in contact with flat surface 4, for example, when each permanent magnet $1b$ is in contact with flat surface 4, original magnetic attraction force of the permanent magnet can be maintained. When permanent magnet $1b$ is configured by using only one perforated columnar magnet similar to perforated columnar magnet $1b2$, magnetic attraction force of the perforated portion is lost when permanent magnet $1b$ is in contact with flat surface 4. Therefore, as described above, each permanent magnet $1b$ is configured by columnar magnet $1b1$ and perforated columnar magnet $1b2$. In addition, in the first embodiment, although a resin screw is used as a fixing screw for decreasing the weight of mobile robot 100, metal screws may be used. The fixed angle at which the magnet of wheel $1c$ is fixed is determined by the circumferential length of driving wheel 1 and the diameter of permanent magnet $1b$ used. The diameter of permanent magnet $1b$ is determined by the weight of mobile robot 100 and magnetic force of the permanent magnet. Accordingly, by making flat surfaces 4 and 9 on which the mobile robot runs and magnet $1b$ of driving wheel 1 facing the flat surfaces to be a flat surface, since driving wheel 1 and flat surface 4 are not in line contact with each other and are in surface contact with each other, unlike a circular magnet wheel, when driving wheel 1 is in contact with flat surface 4, higher magnetic attraction force than the circular magnet wheel can be maintained when mobile robot 100 is stopped.

In addition, rotation driving mechanism 3 such as a motor which drives to independently rotate driving wheel 1 in the forward direction and in the reverse direction respectively is provided on an inside of the pair of driving wheels 1 and on both sides of mobile robot body 2. For example, an encoder for detecting the rotation speed of the motor is provided on the motor of rotation driving mechanism 3, and controller 200 described below also controls a running distance by controlling rotation of the motor based on detection information from the encoder. Mobile robot 100 runs on first flat surface 4 in a direction of arrow b in FIG. 1 by synchronously rotating the pair of driving wheels 1 in the direction of arrow a in FIG. 1 by the pair of rotation driving mechanisms 3. The pair of driving wheels 1 can be driven to be individually rotated in the front direction and in the rear direction respectively with respect to the progressing direction (forward movement) by the pair of rotation driving mechanisms 3. In addition, by the pair of driving wheels 1 being reversely rotated to each other by the pair of rotation driving mechanisms 3, the direction thereof can be converted by super swing turning being performed on first flat surface 4.

Figure 3D:
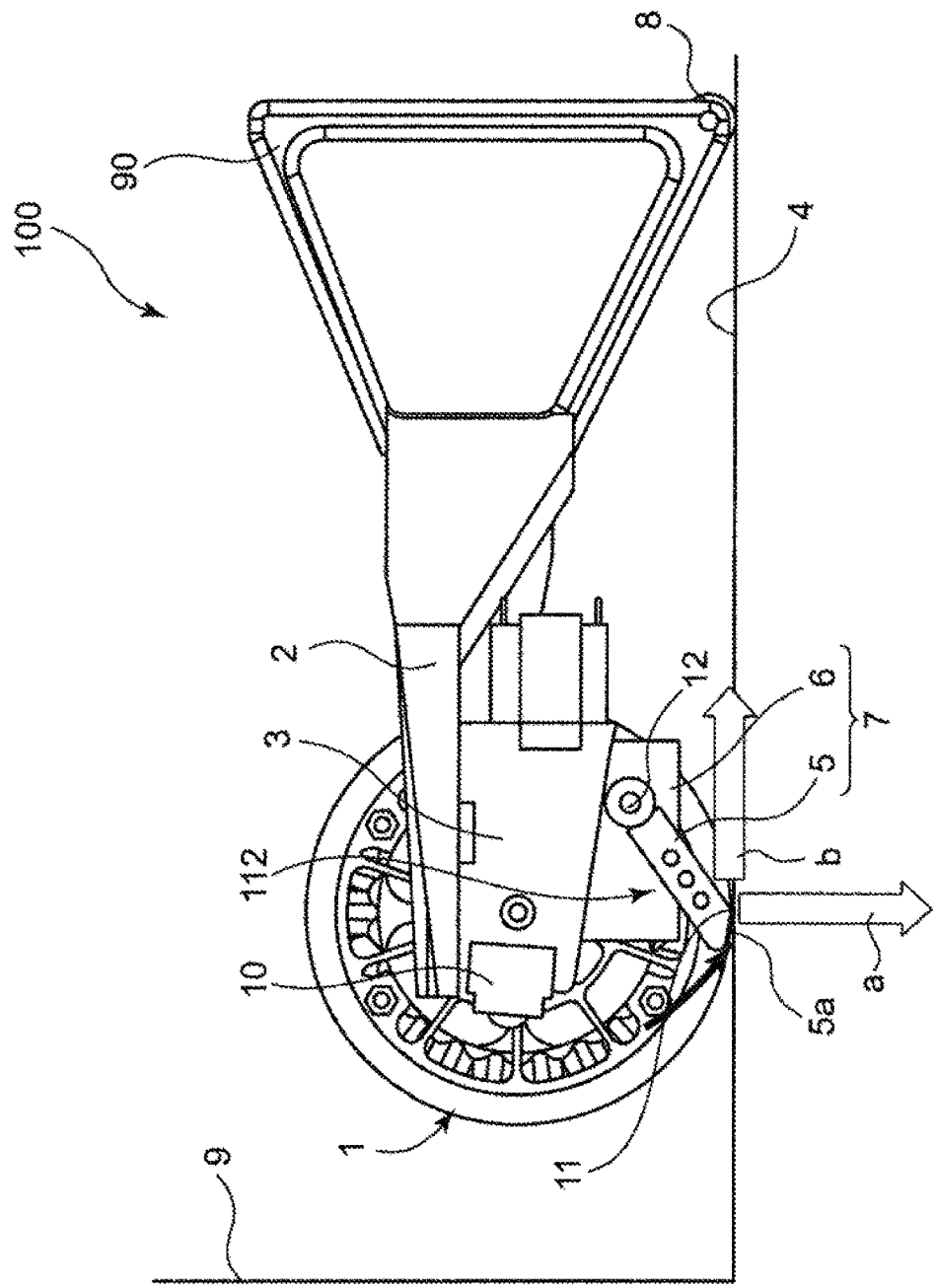
FIG. 3D is a cross-sectional view of the axle of the driving wheel illustrating a pressing out mechanism of the mobile robot in detail.
Figure 4A:
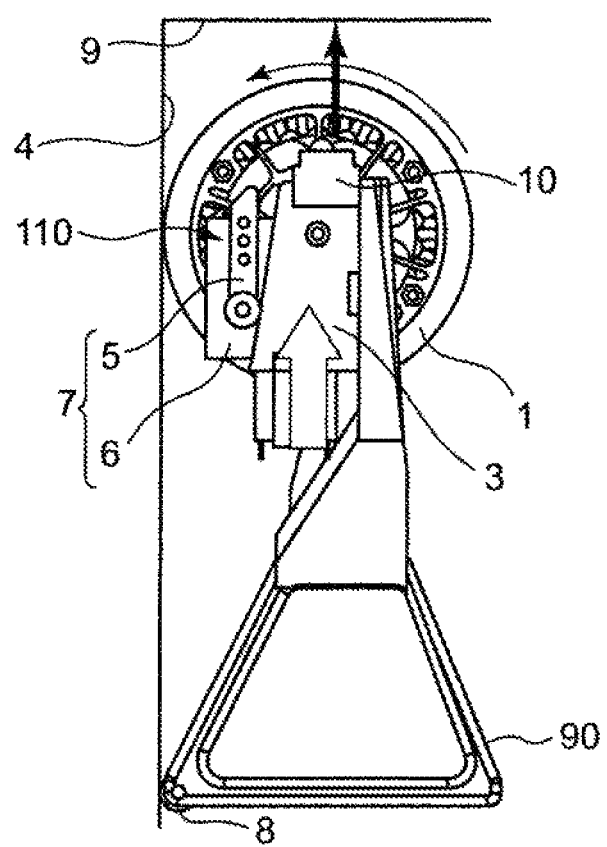
FIG. 4A is a transition view until transfer of the mobile robot from a first flat surface to a second flat surface is completed.
Figure 4B:
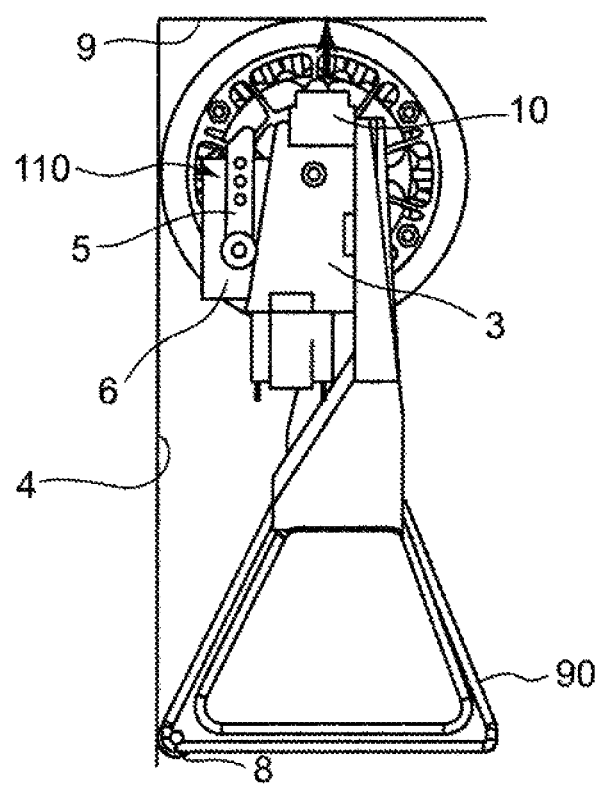
FIG. 4B is a transition view until transfer of the mobile robot from the first flat surface to the second flat surface is completed.
Figure 4C:
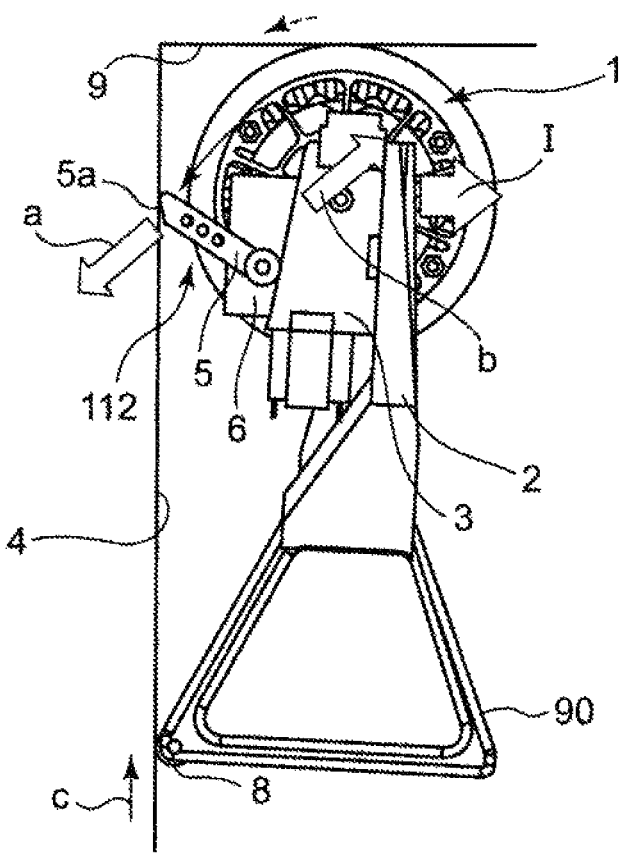
FIG. 4C is a transition view until transfer of the mobile robot from the first flat surface to the second flat surface is completed.
Figure 4D:
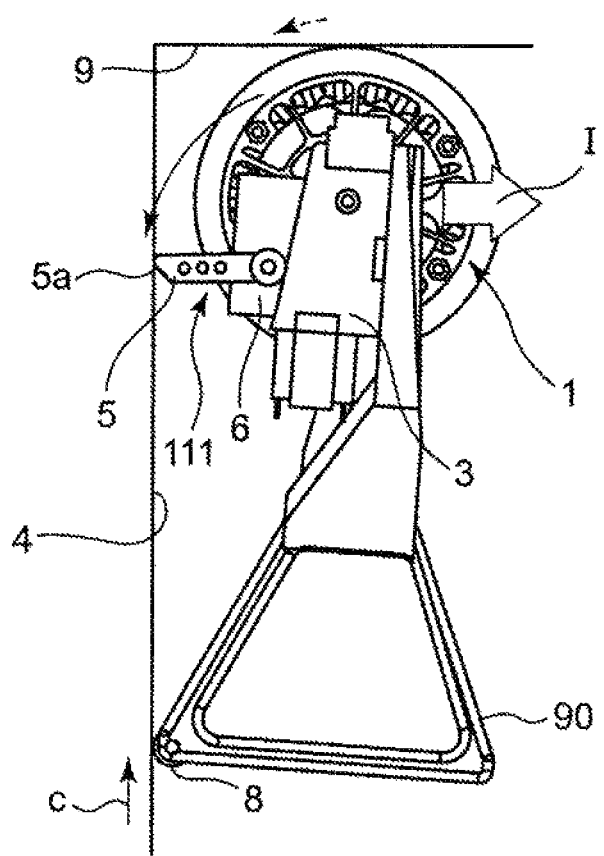
FIG. 4D is a transition view until transfer of the mobile robot from the first flat surface to the second flat surface is completed.
Figure 4E:
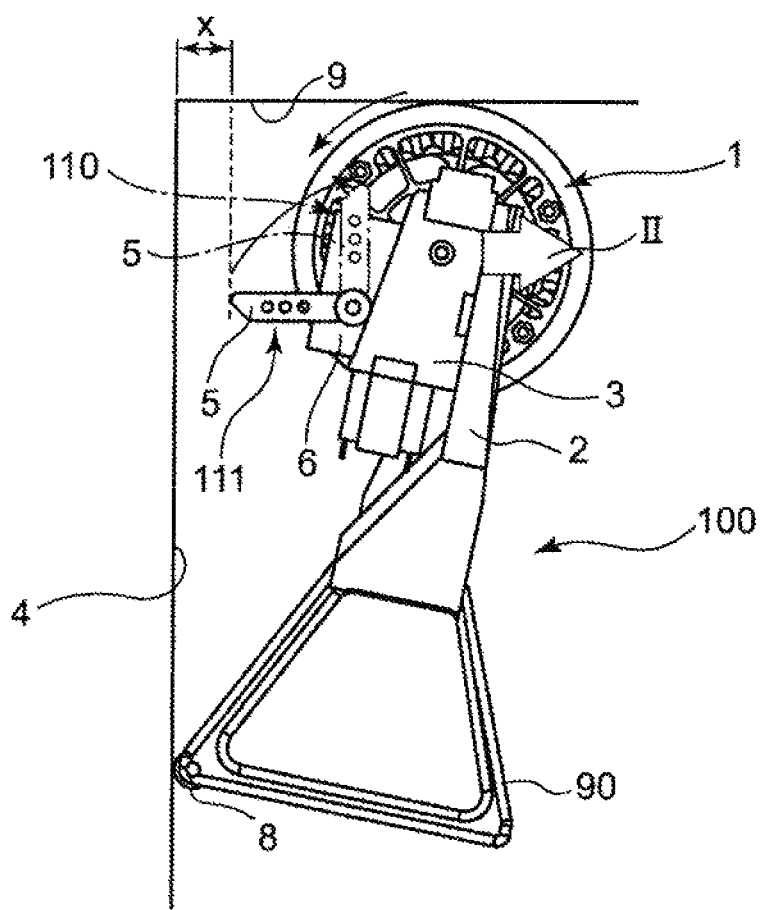
FIG. 4E is a transition view until transfer of the mobile robot from the first flat surface to the second flat surface is completed.

A pair of pressing out mechanisms 7 which is configured by at least one rotatable pressing out arm 5, for example, a pair of pressing out arms on both sides and arm driving mechanism portion 6 such as a motor for driving to synchronously rotate the pair of pressing out arms 5 is provided at both side portions of the front portion of mobile robot body 2. Pressing out arm 5 functions as an example of a pressing out member and is movable between rotation limit position 111 and contact start position 112 which are in contact with first flat surface 4 and retracted position 110 which is retracted from first flat surface 4. Specifically, each pressing out arm 5 is supported both side portions of the front portion of mobile robot body 2 to be rotatable synchronously between retracted position 110 and rotation limit position 111 via contact start position 112 which is in contact with flat surface 4, and pressing out arm 5 can be pressed toward first flat surface 4 with which mobile robot 100 is in contact between contact start position 112 and rotation limit position 111 by driving of arm driving mechanism portion 6. A position between contact start position 112 and rotation limit position 111 is an example of the contact position. Specifically, arm driving mechanism portion 6 is configured by a motor, for example and one end of rod-like pressing out arm 5 is connected to rotation shaft 12 of the motor, pressing out arm 5 is rotatably supported to mobile robot body 2, and inclined surface 5a which can be in contact with flat surfaces 4 on which the mobile robot runs and 9 is provided at the tip of the other end of pressing out arm 5. Therefore, by driving of arm driving mechanism portion 6, the pair of pressing out arms 5 can rotate to the following positions. In other words, as illustrated in FIG. 1, FIG. 4A, and FIG. 4B, the pair of pressing out arms 5 retracts from first flat surface 4 at retracted position 110 at which the tip of the other end thereof faces a front side of mobile robot body 2 and is not in contact with first flat surface 4. In addition, as illustrated in FIG. 3D and FIG. 4C, the pair of pressing out arms 5 in which rotation is started from retracted position 110 toward a lower side of mobile robot body 2 is in a state where contact with first flat surface 4 is started and the lower surfaces of the pair of driving wheels 1 and inclined surfaces 5a of the pair of pressing out arms 5 are in contact with first flat surface 4 at contact start portion 112. As illustrated in FIG. 4D and FIG. 4E, the pair of pressing out arms 5 which is further rotated from contact start position 112 is directed substantially right under mobile robot body 2 at rotation limit position 111 and the first flat surface 4 is pressed at the inclined surfaces 5a of the pair of pressing out arms 5. Accordingly, by pressing the first flat surface 4 by the pressing out arm 5, the lower surfaces of the pair of driving wheels 1 are configured to be completely separated from first flat surface 4, and the magnetic attraction force of the pair of driving wheels 1 can be a state of not being generates with respect to first flat surface 4 which is a magnetic body.

FIG. 3D is a view illustrating pressing out mechanism 7 of mobile robot 100 in detail and is a view illustrating section A-A which is illustrated in FIG. 2 viewed from the right side toward the page of FIG. 2. Here, although the operation of pressing out mechanism 7 is described in a state where the pair of driving wheels 1 is not in contact with second flat surface 9 in order to make it easy to understand, unlike the actual operation, in reality, the operation thereof is performed in a state where the pair of driving wheels 1 is in contact with second flat surface 9.

Pressing out mechanism 7 is rotatably driven so that inclined surface 5a of the respective tips of the pair of pressing out arms 5 is synchronously pressed toward first flat surface 4 by rotating rotation shaft 12 of the motor of arm driving mechanism portion 6 in the counterclockwise direction in FIG. 3D under driving control by controller 200 to be described below. More specifically, when inclined surface 5a of the pair of pressing out arms 5 is in contact with first flat surface 4 at contact start position 112, position 11 of an action point (contact point) between first flat surface 4 and inclined surface 5a thereof is configured to he inclined with respect to first flat surface 4 so as to be closer to second flat surface 9 than a position of the rotation center (center position of rotation shaft 12) of each pressing out arm 5. Specifically, as illustrated in FIG. 3D, contact point 11 between first flat surface 4 which is in contact with mobile robot 100 and each pressing out arm 5 is desirably designed so as to become a forward position of the center position of rotation shaft 12 of arm driving mechanism portion 6 with respect to the progressing direction. Since the tip of each pressing out arm 5 is in contact with first flat surface 4 in a state of being inclined with respect to first flat surface 4, each pressing out arm 5 can apply a force with respect to first flat surface 4 in both directions of a vertical direction with respect to an installation surface of mobile robot 100 as illustrated by downward arrow a in FIG. 3D and a rear direction with respect to the progressing direction of mobile robot 100 as illustrated by rightward arrow b in FIG. 3D. As a result, as will be described below with reference to FIG. 4C, mobile robot 100 can obtain reaction force in the direction indicated by arrow b in FIG. 4C, by force indicated by arrow a in FIG. 4C which is a resultant force of downward arrow a in FIG. 3D and the rightward arrow b in FIG. 3D being applied from the pair of pressing out arms 5 to first flat surface 4 at contact start position 112.

Grip portion 90 having a substantially triangular frame shape is provided in the rear side with respect to the progressing direction of mobile robot body 2 so that a user can easily grasp mobile robot 100 and freely rotating rear wheel roller 8 is rotatably provided at a lower end position thereof which is in contact with first flat surface 4. Rear wheel roller 8 functions as an example of a rear wheel. Rear wheel roller 8 includes magnetic attraction force with respect to the flat surface which is a magnetic body. As this magnetic attraction force, rear wheel roller 8 is configured by a cylindrical magnet and magnetic attraction force of rear wheel roller 8 is set to be weaker than a value summed magnetic attraction forces of the pair of driving wheels 1.

Distance sensor 10 which can measure the distance from the front end surface (or distance sensor 10) of mobile robot body 2 of mobile robot 100 to second flat surface 9 which is orthogonal to first flat surface 4 is provided on the front side of mobile robot 100 with respect to the progressing direction, that is, the front end surface of mobile robot body 2. Here, first flat surface 4 and second flat surface 9 are magnetic bodies and wall surfaces such as, for example, a wall surface and a ceiling surface of a bathroom, or the like, and generally a place where two flat surfaces 4 and 9 are orthogonal to each other.

Information from distance sensor 10 is input to controller 200 and controller 200 drives and controls the pair of rotation driving mechanisms 3 and arm driving mechanism portion 6. Information measured by distance sensor 10 is input to controller 200 and used in driving and controlling of arm driving mechanism portion 6 or the like. Under the drive control by controller 200, arm driving mechanism portion 6 controls rotation of the pair of pressing out arms 5 on both sides thereof in synchronization with each other between retracted position 110 and rotation limit position 111. Therefore, for example, when distance sensor 10 detects that the pair of driving wheels 1 is in contact with second flat surface 9, controller 200 drives and controls arm driving mechanism portion 6, and moves the pair of pressing out arms 5 from retracted position 110 to contact start position 112 to be in contact with first flat surface 4, and thus the pair of driving wheels 1 is separated from first flat surface 4, and the driving of rotation driving mechanism 3 is controlled, and thus the rotation of the pair of driving wheels 1 can be controlled so as to be moved from first flat surface 4 to second flat surface 9.

Next, the movement of mobile robot 100 between the flat surfaces will be described in detail.

FIG. 4A to FIG. 4F are views illustrating an operation until transfer of the mobile robot 100 running on first flat surface 4 (for example, wall along vertical direction) from the first flat surface 4 to the second flat surface 9 (for example, the ceiling) is completed.

FIG. 4A illustrates a state in which the pair of driving wheels 1 of mobile robot 100 runs in the progressing direction (upward) while rotating in the direction of the arrow (counterclockwise). At this time, the pair of pressing out arms 5 is held at retracted position 110 which is not in contact with first flat surface 4. At this time, distance sensor 10 always measures the distance from distance sensor 10 to second flat surface 9 to which mobile robot 100 is to move, and the measurement result information is input to controller 200.

Next, FIG. 4B illustrates a state where mobile robot 100 is in contact with second flat surface 9 to which the pair of driving wheels 1 is to move.

First, according to the measurement result of distance sensor 10, mobile robot 100 allows controller 200 to determine that the pair of driving wheels 1 is in contact with flat surface 9 to which mobile robot 100 is to move and rotation driving mechanism 3 to stop rotation of the pair of driving wheels 1. Specifically, for example, if controller 200 determines that the distance measured by distance sensor 10 is the same as or substantially the same as the distance between the front end of driving wheel 1 and the front end of distance sensor 10, the state at that time means that the front end of driving wheel 1 is in contact with flat surface 9. Therefore, in such a state, the controller 200 may allow each rotation driving mechanism 3 to stop rotation of the pair of driving wheels 1. Alternatively, in a case where the state in which the distance measured by distance sensor 10 is not changed continues during a predetermined time (during several seconds), controller 200 determines that the front end of driving wheel 1 is in contact with flat surface 9, and similarly, the rotation of the pair of driving wheels 1 may be stopped by each rotation driving mechanism 3.

After the rotation of the pair of driving wheels 1 is stopped, under the control of controller 200, mobile robot 100 allows arm driving mechanism portion 6 to start synchronous rotation driving of the pair of pressing out arms 5 from retracted position 110 and to start synchronous rotating driving the pair of pressing out arms 5 in a direction in which each inclined surface 5a of the tips of the pair of pressing out arms 5 is in contact with first flat surface 4.

FIG. 4C illustrates a state in which force is applied to first flat surface 4 by the pain of pressing out arms 5 while second flat surface 9 to which mobile robot 100 is to move and driving wheel 1 are in contact with each other. Under the control of controller 200, mobile robot 100 drives to synchronously rotate the pair of pressing cut arms 5 from retracted position 110 to contact start position 112, force is applied from the pair of pressing out arms 5 to first flat surface 4 at contact start position 112 in the direction indicated by arrow a in FIG. 4C and mobile robot 100 can continue to obtain reaction force in the direction indicated by arrow b in FIG. 4C as described above. In other words, in a positional relationship in which the pair of driving wheels 1 restrained by magnetic attraction force by being in contact with both first flat surface 4 and second flat surface 9, reaction force from first flat surface 4 can act as components of a normal direction of first flat surface 4 and a direction (direction close to second flat surface 9) in which robot body 2 progresses on first flat surface 4.

Due to the reaction force, the pair of driving wheels 1 is slightly rotated while being in contact with second flat surface 9, and mobile robot 100 moves in the direction of arrow I in FIG. 4C. Here, it is assumed that each inclined surface 5a at the tips of the pair of pressing out arms 5 is configured to be slidable on first flat surface 4 when being in contact with first flat surface 4. In a case where each pressing out arm 5 cannot be slid on the first flat surfaced only by shape processing due to the influence of the material of first flat surface 4 or the like, each pressing out arm 5 may be configured by providing a freely rotating roller at the tip thereof. Since rear wheel roller 8 is drawn in a direction which is close to second flat surface 9 as mobile robot 100 is progressed in the direction of arrow I in FIG. 4C, rear wheel roller 8 moves while being in contact with first flat surface 4 in the direction indicated by arrow c in FIG. 4C.

Next, FIG. 4D illustrates a state where the pair of pressing out arms 5 synchronously rotates from contact start position 112 to rotation limit position 111 and the rotating driving is finished, by driving of arm driving mechanism portion 6 under the control of controller 200. At this time, under the control of controller 200, the pair of rotation driving mechanisms 3 is driven again to synchronously rotate the pair of driving wheels 1 and mobile robot 100 moves on second flat surface 9 in the direction of dotted arrow I. At this time, rear wheel roller 8 also moves in the direction indicated by arrow c while being in contact with first flat surface 4.

FIG. 4E illustrates a state where mobile robot 100 reversely rotates the pair of pressing out arms 5 from rotation limit position 111 to original retracted position 110 by driving arm driving mechanism portion 6 under the control of controller 200, the synchronous rotation driving of the pair of driving wheels 1 is started by the pair of rotation driving mechanisms 3 and then the mobile robot is running in the direction of arrow II in FIG. 4E. Alternatively, the synchronous rotation driving of the pair of driving wheels 1 may be started immediately after the rotation driving of the pair of pressing out arms 5 to retracted position 110 is finished. Alternatively, mobile robot 100 may start retraction of the pair of pressing out arms 5 to retracted position 110 immediately after running by distance x in the direction of arrow II in FIG. 4E from the position in FIG. 4D. Here, the fact that the mobile robot runs by distance x can be recognized by an encoder built in the pair of rotation driving mechanisms 3 of the pair of driving wheels 1, for example. Distance x is a distance at which magnetic attraction force of the pair of driving wheels 1 does not influence first flat surface 4. In addition, in the first embodiment, although the pair of driving wheels 1 is synchronously rotated while pressing out arm 5 is retracted to retracted position 110, the synchronous rotation of the pair of driving wheels 1 may be stopped during the retraction of the pair of pressing out arms 5 to retracted position 110, as in the modification example described above.

Figure 4F:
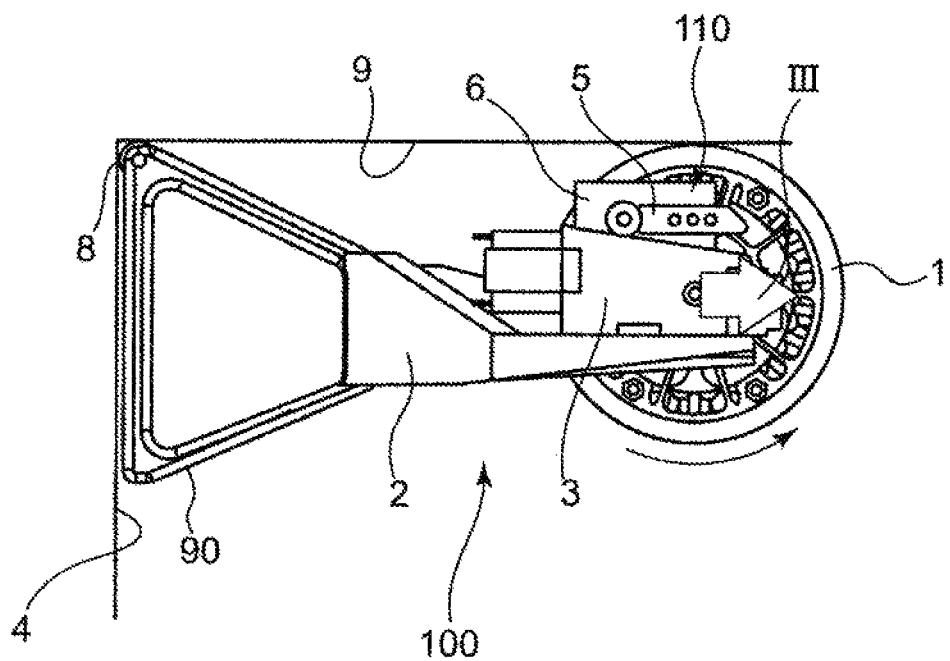
FIG. 4F is a transition view until transfer of the mobile robot from the first flat surface to the second flat surface is completed.

FIG. 4F illustrates a state where rear wheel roller 8 is completely moved to second flat surface 9. In other words, FIG. 4F illustrates a state where after mobile robot 100 reversely rotates the pair of pressing out arms 5 to retracted position 110 to stop pressing out arm 5 by the driving of arm driving mechanism portion 6 under the control of controller 200, mobile robot 100 runs in the direction of arrow II in FIG. 4E and rear wheel roller 8 is simultaneously in contact with both first flat surface 4 and second flat surface 9 by the synchronous rotation driving of the pair of driving wheels 1 by the pair of rotation driving mechanisms 3. As in this state, even if rear wheel roller 8 is restrained by the magnetic attraction force on both first flat surface 4 and second flat surface 9, since rear wheel roller 8 is pulled away from first flat surface 4 by the strong driving force of the pair of driving wheels 1, mobile robot 100 can continue running on second flat surface 9.

According to the first embodiment, even if the pair of driving wheels 1 is restrained by magnetic attraction force on second flat surface 9 orthogonal to first flat surface 4 in which mobile robot 100 is present (that is, even when distance sensor 10 detects that the pair of driving wheels 1 is in contact with first flat surface 4 and second flat surface 9), pressing out arm 5 is moved from retracted position 110 to contact start position 112 by pressing out mechanism 7, pressing out arm 5 is in contact with first flat surface 4, and thus the pair of driving wheels 1 can be separated from first flat surface 4. As a result, magnetic attraction force of the pair of driving wheels 1 does not influence first flat surface 4, and the pair of driving wheels 1 can be rotated on second flat surface 9. Therefore, mobile robot 100 can smoothly move from first flat surface 4 to second flat surface 9, for example, from a wall surface to a wall surface or from a wall surface to a ceiling surface.

Second Embodiment

The disclosure is not limited to the first embodiment and can be implemented in various other aspects. For example, pressing out mechanism 7 is not limited to the configuration described above, a linear motion cylinder may be used, and this case will be described.

Figure 5A:
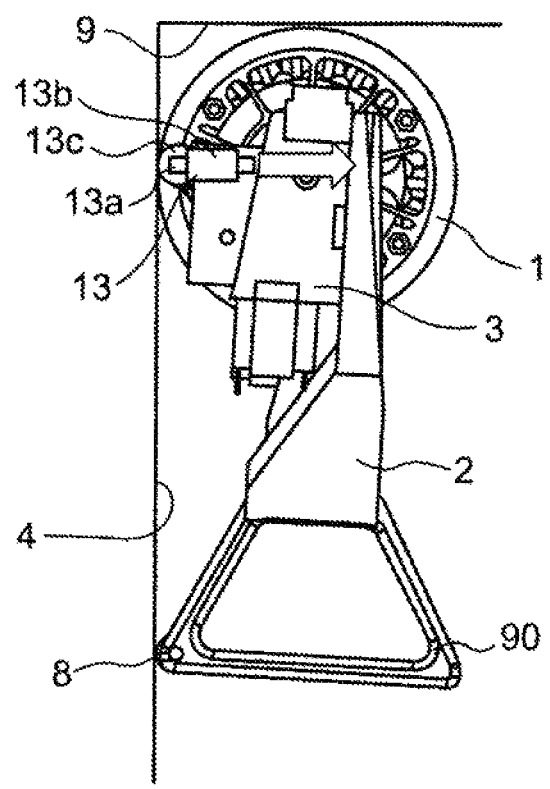
FIG. 5A is a transition view of the mobile robot when a pressing out cylinder is provided.
Figure 5B:
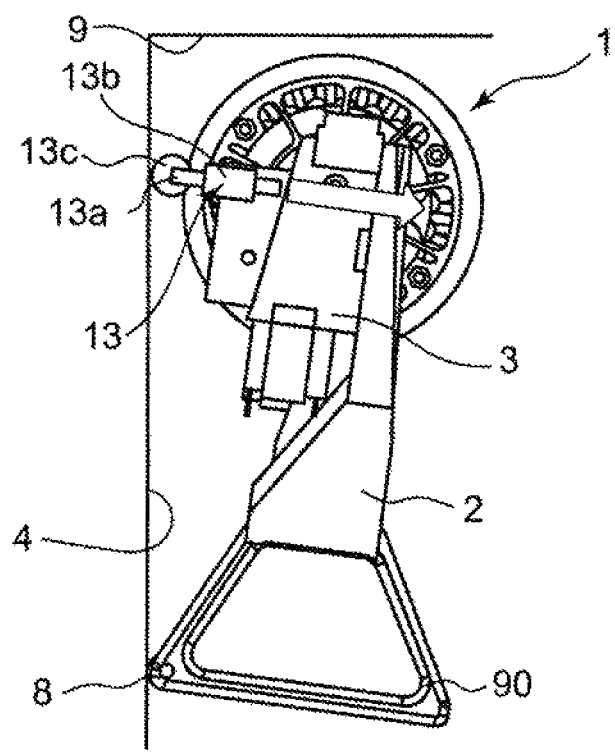
FIG. 5B is a transition view of the mobile robot when the pressing out cylinder is provided.
Figure 5C:
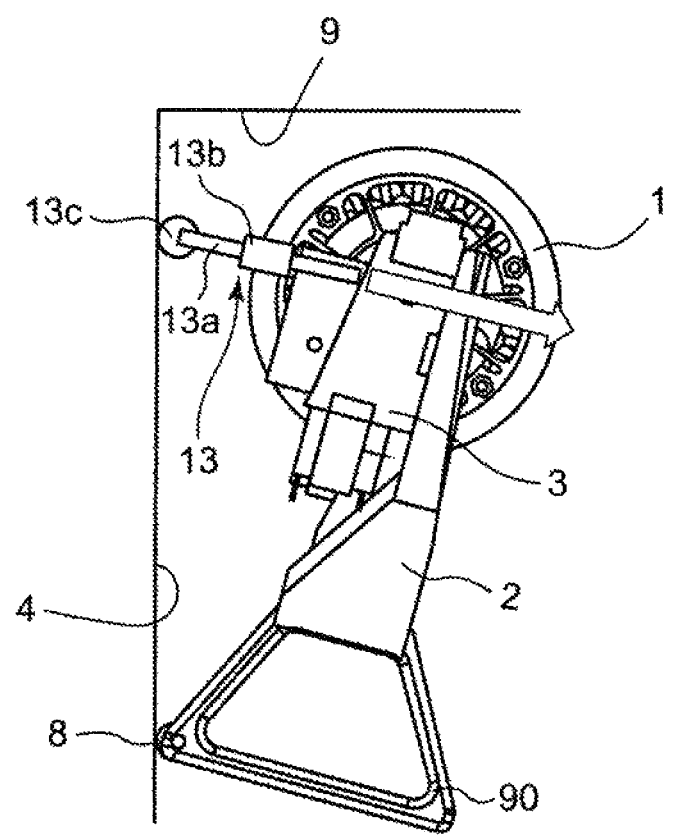
FIG. 5C is a transition view of the mobile robot when the pressing out cylinder is provided.

There are several ways to dispose this cylinder. First, a case where an axial direction of linear motion cylinder 13 is disposed in a direction orthogonal to first flat surface 4 will be considered. FIG. 5A to FIG. 5C illustrate examples of a case where piston 13a of linear motion cylinder 13 is disposed in robot body 2 so as to be orthogonal to first flat surface 4 in a state of being accommodated in cylinder case 13b. A tip of piston 13a of cylinder 13 is provided with roller 13c which freely rotates. In FIG. 5A, cylinder 13 is installed in the vertical direction with respect to first flat surface 4, reaction force from first flat surface 4 is generated only in the normal direction of first flat surface 4, and reaction force does not act in the direction of second flat surface 9. At this time, driving of the pair of driving wheels 1 is in a state of being stopped.

When linear motion cylinder 13 is driven to extend piston 13a as illustrated in FIG. 5B, since mobile robot 100 rotates clockwise about rear wheel roller 8, cylinder 13 presses out in a direction away from second flat surface 9 and thus driving wheel 1 cannot keep contacting the second flat surface 9. In particular, since the gravity acts on mobile robot 100 in a case where first flat surface 4 is a wail surface and second flat surface 9 is a ceiling surface or a wall surface, the magnetic attraction force applied to second flat surface 9 becomes low, mobile robot 100 falls at the moment mobile robot 100 is separated from first flat surface 4, and thus cannot be transferred to second flat surface 9.

As described above, in the present configuration, mobile robot 100 cannot be transferred from first flat surface 4 to second flat surface 9.

Figure 6A:
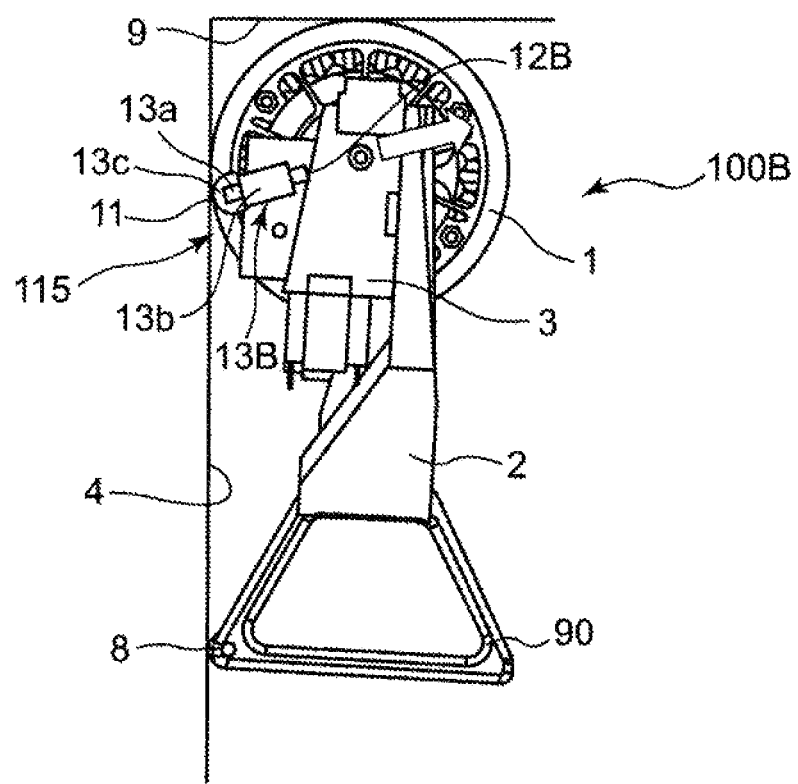
FIG. 6A is a transition view illustrating an example of a pressing out mechanism according to a second embodiment.
Figure 6B:
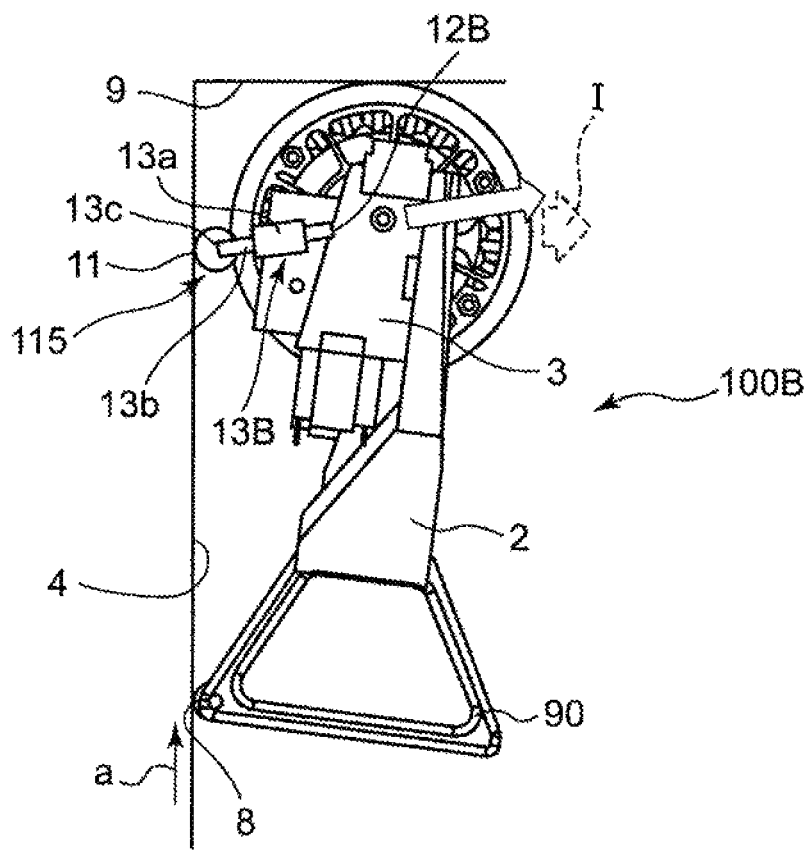
FIG. 6B is a transition view illustrating an example of the pressing out mechanism according to the second embodiment.
Figure 6C:
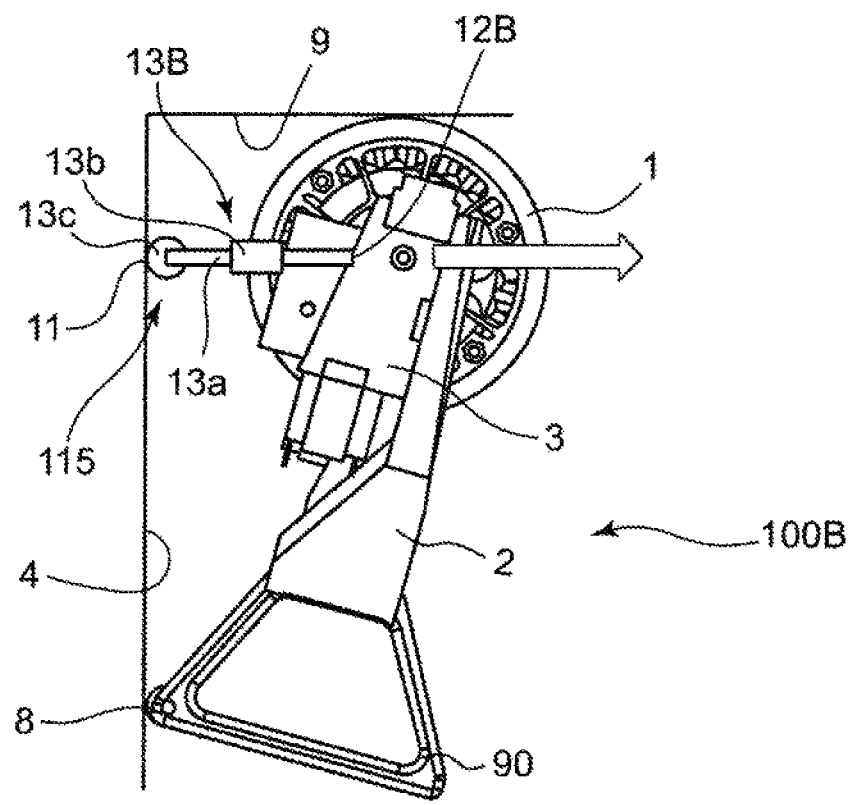
FIG. 6C is a transition view illustrating an example of the pressing out mechanism according to the second embodiment.
Figure 7:
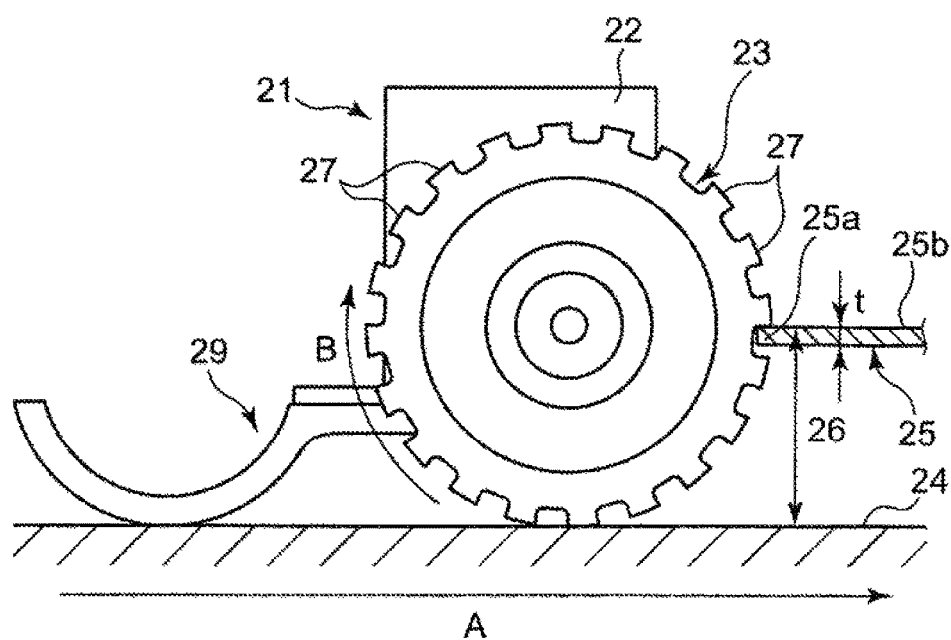
FIG. 7 is a side view illustrating a mobile robot of the related art.

Therefore, in the second embodiment of the disclosure, in order to solve the problem illustrated in FIG. 5A to FIG. 5C, by changing the disposition of linear motion cylinder 13B so as to be different from the disposition of linear motion cylinder in FIG. 5A to FIG. 5C, mobile robot 100B according to the second embodiment of the disclosure which can transfer from first flat surface 4 to second flat surface 9 is illustrated in FIG. 6A to FIG. 6C. Here, linear motion cylinder 13B functions as another example of the pressing out mechanism.

In the configuration, unlike FIG. 5A to FIG. 5C, linear motion cylinder 13B is disposed on robot body 2 so that one end of linear motion cylinder 13B is supported to robot body 2, at the other end thereof, piston 13a advances and retracts with respect to cylinder case 13b, and thus tip of piston 13a can be in contact with first flat surface 4 at contact position 115 extended from cylinder case 13b and one end thereof is inclined so as to be further positioned on the front side than the other end thereof in the progressing direction. In other words, linear motion cylinder 13B is disposed on robot body 2 so that the axial direction thereof is inclined with respect to first flat surface 4 so as to be close to second flat surface 9 as being away from first flat surface 4. Specifically, as illustrated in FIG. 6A, linear motion cylinder 13B is configured to be inclined with respect to first flat surface 4 so that support point (upper end) 12B of linear motion cylinder 13B attached to robot body 2 is closer to second flat surface 9 than an action point (contact point) 11 with first flat surface 4. Linear motion cylinder 13B is driven under the control of controller 200 so that piston 13a advances and retracts with respect to cylinder case 13b between the retracted position at which piston 13a is accommodated in cylinder case 13b and roller 13c at the tip of piston 13a is separated and retracted from first flat surface 4 and contact position 115 at which piston 13a extends from cylinder case 13b and roller 13c at the tip of piston 13a is in contact with first flat surface 4. Here, piston 13a functions as another example of the pressing out member.

FIG. 6A illustrates positions of mobile robot 100B and linear motion cylinder 13B when the pair of driving wheels 1 is restrained by magnetic attraction force on first flat surface 4 and second flat surface 9 after the pair of driving wheel 1 run on first flat surface 4 is in contact with second flat surface 9 under the control of controller 200. Here, as described above, the linear motion cylinder 13B is inclined with respect to first flat surface 4 so that support point 12B of linear motion cylinder 13B attached to arm driving mechanism portion 6 is closer to second flat surface 9 than action point (contact point) 11 with first flat surface 4. At this time, mobile robot 100B can obtain reaction force from the first flat surface 4 in both directions of the normal direction of first flat surface 4 and a direction (direction being close to the second flat surface 9) in which mobile robot 100B progresses on first flat surface 4 by mobile robot 100B using linear motion cylinder 13B under the control of controller 200, roller 13c at the tip of piston 13a extending from the retracted position to contact position 115 to be in contact with first flat surface 4, and thus force being applied to first flat surface 4. The driving of driving wheel 1 is in a state of being stopped.

Next, as illustrated in FIG. 6B, under the control of controller 200, driving wheel 1 is rotated while being in contact with second flat surface 9 and mobile robot 100B is moved in the direction (direction along second flat surface 9) of dotted arrow I in FIG. 6B. In addition, rear wheel roller 8 also moves in the direction of arrow a in FIG. 6B while being in contact with first flat surface 4.

Next, FIG. 6C illustrates a state where piston 13a of linear motion cylinder 13B is most extended under the control of controller 200. Thereafter, or at the same time, mobile robot 100B can run along second flat surface 9 by starting the rotation driving of the pair of driving wheels 1 under the control of controller 200.

According, to the second embodiment, effects similar to those of the first embodiment can be achieved.

The respective effects can be achieved by any embodiment or modification example of the various embodiments or modification examples being appropriately combined with each other. In addition, combinations of the embodiments with each other, combinations of the examples with each other, or combinations of the embodiment and the example with each other are possible and combinations of features in different embodiments or examples from each other are also possible.

The mobile robot according to the above aspects of the disclosure can be moved between two flat surfaces in a case where the two flat surfaces intersect each other and can be applied not only for cleaning the bathroom but also for cleaning or inspection of buildings.

What is claimed is:

1. A mobile robot that runs from a first flat surface which is a magnetic body to a second flat surface which is a magnetic body and intersects the first flat surface, the robot comprising:
a robot body;
a pair of driving wheels which is rotatably supported to the robot body and includes permanent magnets on outer circumferential surfaces thereof;
a driving mechanism which is provided to the robot body and drives the pair of driving wheels to be independently rotated, respectively;
a rear wheel which is rotatably supported to the robot body and includes permanent magnets on an outer circumferential surface thereof;
a distance sensor which is provided to the robot body and acquires a distance to the second flat surface; and
pressing out mechanisms which are provided to the robot body and include pressing out members which are movable between a contact position at which the pressing out member can be in contact with the first flat surface and a retracted position at which the pressing out member is retracted from the first flat surface,
wherein the pressing out member is moved from the retracted position to the contact position to be in contact with the first flat surface by the pressing out mechanism, the driving wheels are separated from the first flat surface, and the driving wheels move from the first flat surface to the second flat surface, when the distance sensor detects that the driving wheels are in contact with the second flat surface.

2. The mobile robot of claim 1,
wherein the pressing out mechanism is configured by pressing out arms which are the pressing out members supported to the robot body to be rotatable between the contact position at which the pressing out member can be in contact with the first flat surface and the retracted position at which the pressing out member is retracted from the first flat surface; and an arm driving mechanism portion which drives and rotates the pressing out arms,
wherein the pressing out arms are rotated from the retracted position to the contact position by the arm driving mechanism portion, the pressing out arms are in contact with the first flat surface at the contact position, and the driving wheels are separated from the first flat surface.

3. The mobile robot of claim 1,
wherein the pressing out mechanism is configured by a linear motion cylinder which advances and retracts a piston as the pressing out member, and
wherein the linear motion cylinder has one end which is supported to the robot body and the other end at which the piston is advanced and retracted and thus a tip of the piston is capable of being in contact with the first flat surface at the contact position and the cylinder is disposed on the robot body in an inclined state so that the one end thereof is positioned on a front side of the other end thereof in a progressing direction.

4. The mobile robot of claim 1, further comprising:
a controller which controls the driving of the pressing out mechanism to allow the pressing out member to be moved from the retracted position to the contact position and to be in contact with the first flat surface, and to allow the driving wheels to be separated from the first flat surface, and controls the driving of the driving mechanism to allow the driving wheels to be rotated in order to be moved from the first flat surface to the second flat surface, when the distance sensor detects that the driving wheels is in contact with the second flat surface based on information acquired from the distance sensor.

5. The mobile robot of claim 1,
wherein the first flat surface and the second flat surface on which the mobile robot rung are orthogonal to each other.

6. The mobile robot of claim 2,
wherein the pressing out mechanism is configured by a linear motion cylinder which advances and refracts a piston as the pressing out member, and
wherein the linear motion cylinder has one end which is supported to the robot body and the other end at which the piston is advanced and retracted and thus a tip of the piston is capable of being in contact with the first flat surface at the contact position and the cylinder is disposed on the robot body in an inclined state so that the one end thereof is positioned on a front side of the other end thereof in a progressing direction.

7. The mobile robot of claim 6, further comprising:
a controller which controls the driving of the pressing out mechanism to allow the pressing out member to be moved from the retracted position to the contact position and to be in contact with the first flat surface, and to allow the driving wheels to be separated from the first flat surface, and controls the driving of the driving mechanism to allow the driving wheels to be rotated in order to be moved from the first flat surface to the second flat surface, when the distance sensor detects that the driving wheels is in contact with the second flat surface based on information acquired from the distance sensor.

8. The mobile robot of claim 2, further comprising:
a controller which controls the driving of the pressing out mechanism to allow the pressing out member to be moved from the retracted position to the contact position and to be in contact with the first flat surface, and to allow the driving wheels to be separated from the first flat surface, and controls the driving of the driving mechanism to allow the driving wheels to be rotated in order to be moved from the first flat surface to the second flat surface, when the distance sensor detects that the driving wheels is in contact with the second flat surface based on information acquired from the distance sensor.

9. The mobile robot of claim 1, wherein the driving mechanism which drives the pair of driving wheels further includes an encoder for measuring a first distance at which magnetic attraction force of the pair of driving wheels does not influence the first flat surface, and wherein the pressing out member is moved from the retracted position to the contact position to be in contact with the first flat surface by the pressing out mechanism after running the first distance from a first predetermined position.

* * * * *